United States Patent [19]

Carter et al.

[11] 4,310,848
[45] Jan. 12, 1982

[54] COLORIMETRIC EVALUATION OF PHOTOGRAPHIC FILM

[75] Inventors: William D. Carter, Rancho Palos Verdes; Martin S. Mueller, Torrance, both of Calif.

[73] Assignee: Carter Equipment Co., Inc., Lawndale, Calif.

[21] Appl. No.: 86,177

[22] Filed: Oct. 18, 1979

[51] Int. Cl.³ .............................................. H04N 1/46
[52] U.S. Cl. .......................................... 358/76; 358/80
[58] Field of Search ............................... 358/76, 78, 80

[56] References Cited

U.S. PATENT DOCUMENTS 4,087,176  5/1978  Nigg ........................................ 358/76
4,096,523  6/1978  Belmares-Sarabia et al. ........ 358/80

Primary Examiner—Richard Murray
Attorney, Agent, or Firm—Gene W. Arant

[57] ABSTRACT

A method and apparatus for colorimetric evaluation of photographic film by passing light through the film to form a visual image, determining corrections to be made to provide a desired color corrected version of the image, and providing such corrections by adjusting the intensities of separate light beams of different primary colors which are used to form the visual image.

9 Claims, 3 Drawing Figures

COLORIMETRIC EVALUATION OF PHOTOGRAPHIC FILM

BACKGROUND OF THE INVENTION

In original photography it is possible to control the exposure of the camera original, but not with the degree of precision that is desired. It has therefore been the practice of the motion picture film industry to undertake a color analysis or "timing" of the film, and make appropriate adjustments of the color and intensity balance before preparing release prints. The initial timing of the film requires the qualitative judgment of a qualified person, but some subsequent processing steps can be performed automatically by means of appropriate equipment.

More specifically, a typical motion picture includes a sequence of separate scenes, with each scene having a duration from a few seconds to about a minute or more. It therefore requires a number of frames of the original film to depict each scene. The lighting conditions for each scene remain substantially constant throughout that particular scene. It has therefore been the practice in the "timing" of original film to view one or more frames of each scene, determine the appropriate color corrections for that frame which will then be also applied to all of the other frames of that scene, and then go to a frame of the next succeeding scene.

According to presently established technology the overall process of determining the color corrections and incorporating them into the release prints involves three separate phases. In the first phase the original film is reviewed by a qualified person who determines what the color corrections should be and records information indicating the magnitude of such corrections.

In the second phase of the process an appropriate duplicate of the original film is printed from the original film, and the previously recorded information indicating the color corrections to be made in the frames of each scene are effected by use of automatic equipment. Specifically, a variable light source is used in which light beams of three primary colors are formed separately and are then combined into a composite light beam, and automatic means responding to the previously recorded information varies the intensity of the primary color light beams so as to thereby vary both the intensity and the chroma, or color characteristic, of the composite beam. It will therefore be understood that the duplicate original film, though duplicating the picture information obtained in the original photography, nevertheless incorporates an adjusted or refined version of the colorimetric information.

The third phase of processing in accordance with present technology is quite straightforward. The duplicate original film is fed to a high speed printer for printing whatever number of release prints are desired. Since necessary corrections had been made previously, this is a straightforward printing or copying operation.

The present invention is not directed to either the second phase or the third phase of the conventional process, but is directed only to the first phase of that process. According to the present invention the objective of the first phase of the process remains the same, but the specific technique or steps, and the equipment used to carry them out, are significantly different.

Therefore, the object and purpose of the present invention is to provide an improved method and apparatus for performing a subjective colorimetric evaluation of photographic film, and for recording the information obtained from such evaluation.

DRAWING SUMMARY

FIG. 3 shows a reference film used in calibrating the apparatus.

DETAILED DESCRIPTION OF PREFERRED EMBODIMENT

Figure 1:
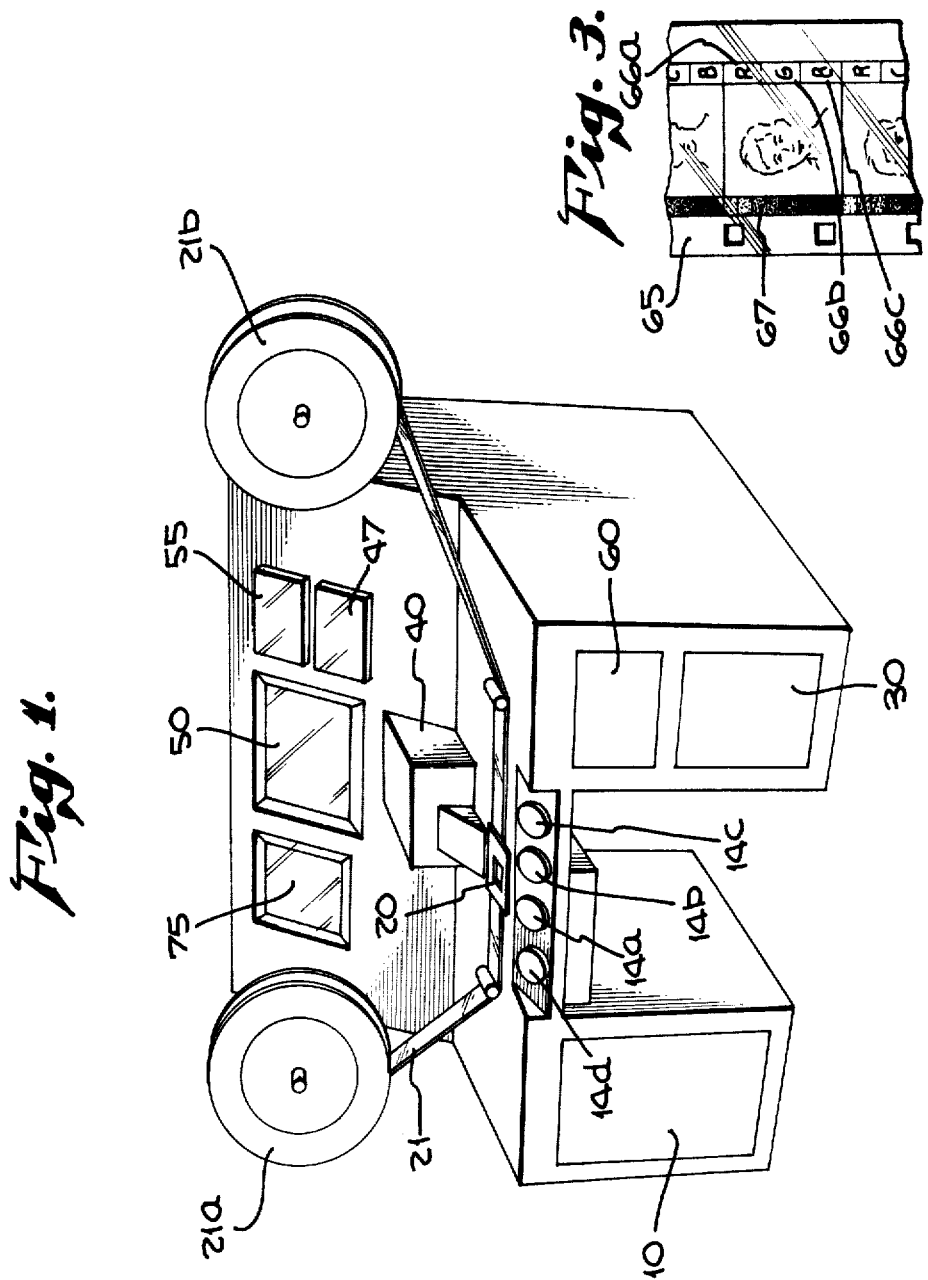
FIG. 1 is a perspective view of the machine or apparatus that is provided in accordance with the present invention.

As shown in FIG. 1 the apparatus of the present invention is conveniently arranged in a desk-type installation for use by a single operator. A master film strip 21 fed from a supply roll 21a to a take-up roll 21b passes through a film gate 20 where it is exposed to the immediate view of a television camera 40. The particular frame then being projected appears on the screen of a television monitor 50. It will be noted that, for convenience of the operator, both the gate 20 and monitor 50 are directly in front of the location where the operator will sit.

Figure 2:
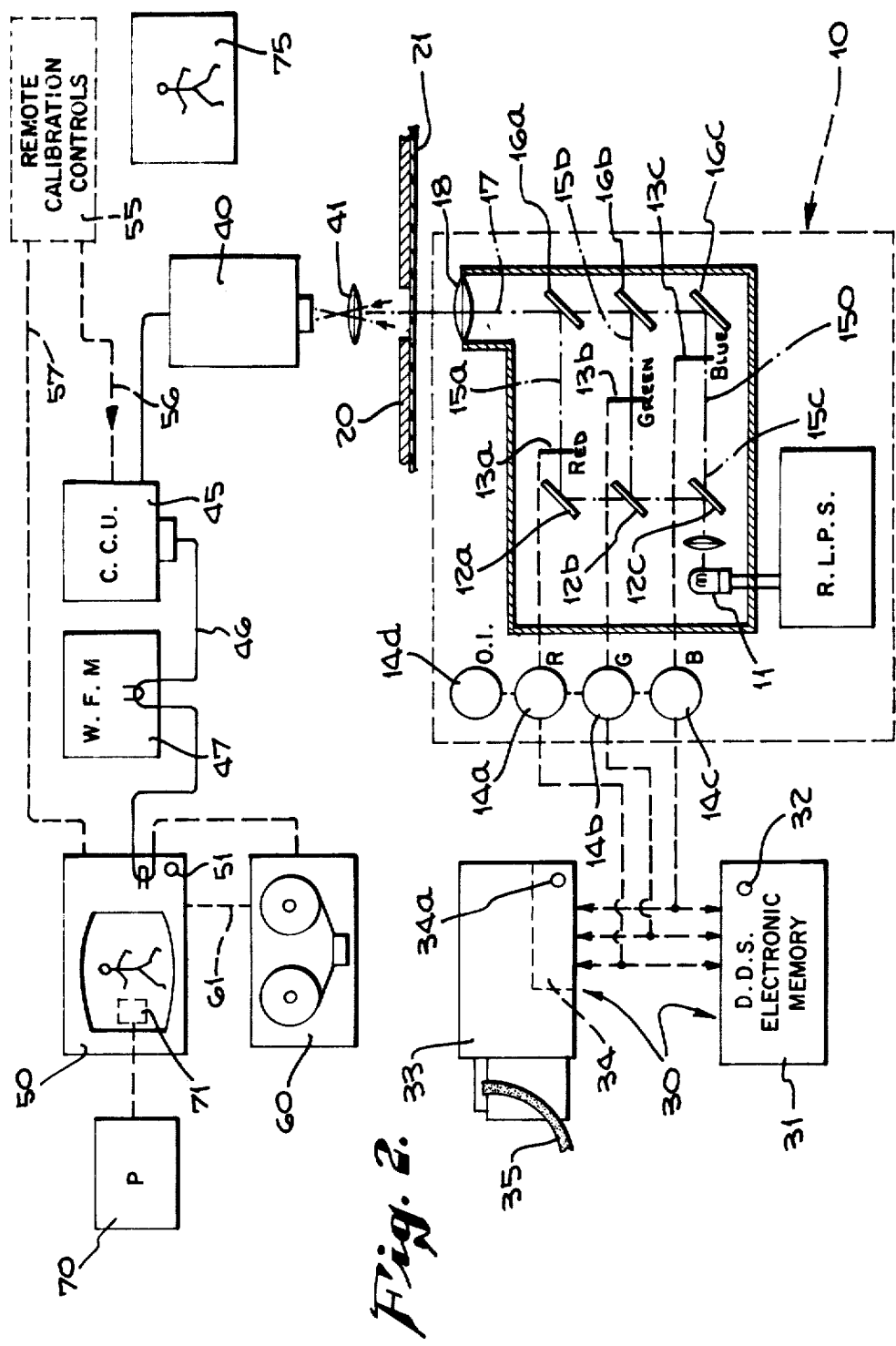
FIG. 2 is a schematic block diagram of the apparatus.

For a more detailed explanation of the apparatus and its method of operation, reference is now made to FIG. 2. Of particular importance is a light source 10 which is of a type that has heretofore been used in the third phase of the overall process, namely, for printing release prints from a duplicate original. However, so far as known to the applicants herein, neither this particular type of light source, or any similar or equivalent light source, has heretofore been used in the first phase of the overall process wherein a subjective analysis of the camera original or master strip of film is being made.

Light source 10 includes a lamp 11 generating white light which is supplied to dichroic filters 12a, 12b, and 12c. Filter 12c is selected to permit passage of a blue beam of light only while reflecting the green and red light. Filter 12b is selected to reflect the beam of green light and permit passage of the red light. Filter 12a is a front surface mirror. These three light beams then pass through respectively correspondingly adjustable shutters or modulators 13a, 13b, 13c. The primary color beams 15a, 15b, 15c then impinge upon front surface mirror 16 which reflects the blue light, dichroic filter 16b selected to transmit the blue light and reflect the green light, dichroic filter 16a which is selected to permit reflection of the red beam while permitting the transmission of the blue and green beams which act to converge the three separate beams into a single composite or integrated beam of light 17. Composite beam 17 passes through a lens 18 to the film gate 20, not specifically shown in FIG. 2.

Also included in the light source 10 are control knobs 14a, 14b, 14c. Each of these control knobs is adapted to be manually set or reset as desired, and each controls a corresponding one of the modulators. For example, control knob 14a controls the modulator 13a and hence the intensity that the red light beam 15a will have when it strikes the dichroic mirror 16a. Although not specifically shown in the drawing, it is conventional practice to calibrate the settings of the control knobs for positions 1 through 50, inclusive. Thus if it is desired that the composite beam 17 should be a pure white light, with equal values of the primary color components, then all of the knobs 14 will be set for the same numerical value. The light source 10 also includes an intensity control knob 14d which controls the intensity of all three primary color beams in unison. It is therefore possible to set all of the knobs 14a, 14b, 14c at the numerical value of 25, and then by adjusting the setting of the intensity control knob 14d to bring the output intensity of composite beam 17 to the level that is desired for the purpose of projecting the film being viewed.

Although not specifically shown in the drawing, light source 10 conventionally also includes suitable conversion devices so that the numerical setting of a particular control knob 14 may be converted into binary coded electrical signals that represent the numerical value of the setting. It is then possible to store the electrical signals and either immediately or subsequently use the signals for punching the information into a paper tape, which has been found by the industry to be a convenient way to record the color correction information.

Thus the apparatus as shown in FIG. 2 also includes a data storage system generally identified as 30, containing an electronic memory 31. A transfer button 32 on the memory may be manually depressed by the operator for transferring into the memory electrical signals representing the settings of the three control knobs 14a, 14b, 14c, that correspond to a particular frame of the film being viewed. Data storage system 30 also includes a paper tape punch 33 that is controlled by a microprocessor 34 to produce a punched paper tape 35.

Alternatively, the setting information may be recorded by hand and later incorporated directly into the punched paper tape. By means of the film gate 20 the strip of film 21 being analyzed is guided through a desired plane above the light source. Positioned immediately above the film is a conventional color television camera 40 having an image focusing lens 41. The output signal from the camera passes to a camera control unit 45 where the signal is appropriately modified for reasons that will later be described. From the camera control unit an image signal is supplied on line 46 to a waveform monitor 47, the color television monitor 50, and a video tape recorder 60.

In order to produce the photographic image in its desired form and stance on the screen of television monitor 50 it is necessary to make a number of corrections in the electronic signal information that is initially developed by the camera. For example, the picture may appear sideways on the film in which case it must be shifted 90 degrees; or it may appear on the monitor as a photographic negative unless it is electronically reversed in the camera control unit 45 into positive form. A remote calibration unit 55 is supplied with a number of control knobs for controlling the settings of the control unit 45 and also of the color television monitor 50, and is suitably coupled to them as shown by dotted lines 56 and 57. The appropriate settings for the remote calibration unit 55 are determined in part by viewing the picture as it appears on the monitor 50, and are also determined in part by information displayed on the screen of the waveform monitor 47 relative to the color content of the signals as acquired by the camera, intensity level, and the like.

Also included in the apparatus is a photometer 70 having a probe 71. The photometer is used in conjunction with a reference film 65 as shown in FIG. 3. Before threading the master strip of film 21 through the film gate 20 the reference film 65 is inserted into the gate for standardizing the performance of the television camera and its related apparatus. For example, the reference film 65 in addition to a representative picture frame may also carry spots 66a, b, c of pure red, green, and blue color, and a grey scale 67. The photometer probe 71 is then placed immediately in front of the screen of television monitor 50, and in front of the different spots, so that the photometer will indicate whether or not the desired standard values of the colors and overall system contrast have been achieved in passing through the television system. If not, adjustments are made in the settings in the remote calibration unit 55.

Also included in the apparatus of the present invention is a reference film projector 75, which projects a selected frame of a reference film for the subjective guidance of the operator and may be turned on and off as desired by the operator.

METHOD OF OPERATION

The first step is to calibrate the television apparatus. This is accomplished by inserting the reference film 65 into the gate 20, making suitable measurements with the photometer and waveform monitor, and then making necessary adjustments by changing the settings in the remote calibration unit. The purpose of these adjustments is to standardize the performance of the television camera and its related equipment including the camera control unit and television monitor. Once this is accomplished the settings of the remote calibration unit 55 will remain essentially unchanged while the master strip of film 21 is being analyzed.

The next step is to remove the reference film 65 from the gate and to insert the master strip of film 21 through the gate.

Now the color analysis of the master strip of film is commenced. According to presently accepted practice the operator will view one of the first few frames of each scene on the film. Color adjustments for that frame will be determined and recorded.

To determine the color adjustments that should be made the operator looks at the picture as displayed on the television monitor 50. As an aid for better subjective evaluation, the operator may also refer to the reference standard positive film that is displayed on the reference projector 75. The settings of the control knobs 14a, 14b, 14c are manually adjusted as necessary in order to produce the desired color characteristics of the picture on the monitor 50. When the operator is satisfied with the image, he or she then depresses the transfer button 32 causing electronic signals representing the settings of the three control knobs to be recorded in the electronic memory.

Then the operator manually advances the master strip of film, using auxiliary apparatus which is conventional but not specifically illustrated, so as to arrive at the next scene of the picture. The electronic memory 31 is automatically synchronized with the master strip of film 21, by means of apparatus that is conventional but not specifically illustrated. Therefore, as the operator advances the master strip of film to the desired position of the second scene, the electronic memory 31 also moves to a storage position corresponding to the second scene. The operator now evaluates the second scene from a study of the exemplary frame, makes desired readjustments (if any) in the positions of the knobs 14a, 14b, 14c, and again depresses the button 32 so as to store electronic signals representing the knob position settings for that scene.

This process may then be continued so that each of the scenes of the film is analyzed in sequence, and electronic signals representing the desired color settings for each scene are recorded in the memory. When the analysis is completed a start button 34a for the microprocessor 34 is then depressed, and all of the storage signals are taken from the memory and fed to the paper tape punch 33 so as to produce a punched paper tape 35 representing desired color corrections for the entire film. Punched paper tape 35 represents the final output of this system of apparatus and may then be fed to a continuous printing system for use in phase two of the overall process, namely, manufacturing a duplicate original which will incorporate the desired color corrections as determined by the operator of the present apparatus.

It will be noted that electronic signals representing the corrected image are not only displayed on the color television monitor 50 but are also at the same time fed by means of the signal line 46 to the video tape recorder 60 where they may be recorded at the discretion of the operator. The use of the video tape recorder adds a flexibility and capability not found in prior apparauts used for color analysis. Specifically, after the analysis of any scene or series of scenes has been completed, the operator may then switch a review button 51 that is provided on the monitor 50. The switching of the review button disconnects the image signal line 46 from both the monitor and the video tape recorder, switches the video tape recorder back to its starting position, and also switches the video tape recorder into a playback mode. The playback signal from the video tape recorder is fed on an output line 61 to the monitor, producing a series of images corresponding to the respective scenes already analyzed, which may then be conveniently viewed by the operator. Alternatively, the apparatus may incorporate several individual controls, not shown, in lieu of the single review button 51.

Let it be supposed, for example, that the analysis of fifteen scenes has been completed before the operator depresses the review button 51. He then concludes that the color adjustments for scenes 4 and 13 are inconsistent with each other. Upon pushing the review button on the second time he further concludes that the corrections for scene 13 are acceptable but those for scene 4 are not. His next step is then to manually return the master strip of film 21 to a position corresponding to scene 4. Since the memory 31 is synchronized with the film 21, the memory also returns to that position. The operator may now reevaluate scene 4, and a new set of numbers will then be transferred into the memory 31 where they will be substituted in place of the set of numbers that was originally recorded. The operator has therefore successfully reviewed his own work and revised his earlier evaluation of scene 4. Since the paper tape is not manufactured until the entire film has been evaluated, that tape when manufactured will incorporate the revised numerical values for scene 4, not the numerical values that the operator had initially selected.

ADVANTAGES

It has been the universal practice heretofore to utilize complex and expensive electronic equipment to perform the colorimetric analysis of photographic film. Light source 10 has been available for some years and has been used in phase three of the overall process, but apparently no one in the industry has previously realized the possibility of using this type of light source in the evaluation process. This type of light source is far simpler and far less expensive than the complex electronic apparatus heretofore used. It is simple to operate and has minimum maintenance problems. An important advantage of using the light source 10 is that the same dichroic filters may be used in phase two and phase three, thereby achieving a greater correlation of data than heretofore obtainable. A further advantage is that when changing to a different film type, it is only necessary to change the mechanical cams associated with controls 14.

The main advantage of the use of color television camera 40 in carrying out the method or process of the present invention lies in its simplicity, stability, commercial availability, and ease of maintenance.

The video tape recorder 60 makes possible the reevaluation procedure as earlier described.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. Apparatus for colorimetric evaluation of photographic film, comprising:
    a variable light source producing a light beam;
    means for applying said light beam to a negative strip of film to produce a negative visual image;
    a color television camera cooperable with said light source for producing a first set of video signals representing said negative image;
    electronic means associated with said camera and operable for inverting said first set of video signals to thereby produce a second set of video signals representing said image in a photographically positive form;
    a color television monitor coupled to said electronic means and responsive to said second set of video signals for reproducing said image in a positive visual form; and
    manually operable means for mechanically adjusting the chroma and intensity of said light beam so as to correct the color of said positive visual image.

2. Apparatus in claim 1 which further includes a video tape recorder coupled to said electronic means for recording said second set of video signals.

3. The method of analyzing color film by passing light through the film to form a visual image and then establishing adjustments in the intensity and chroma of the light which will provide a desired color-corrected version of the image, comprising the steps of:
    selecting a standard light source;
    separating the light from the source into three separate beams corresponding to respective primary colors;
    combining the separate beams to form a composite beam;
    passing the composite beam through the film to form the image, and
    making color-correction adjustments in the intensities of the three separate beams before they are combined, but not in the composite beam.

4. A method of colorimetric analysis of a color film whose frames carry a sequence of filmed scenes, comprising the steps of:

selecting a variable light source having means for manually selectively adjusting the intensity of each of three primary colors of light to thereby produce a composite light beam having a desired chroma and intensity;

applying said composite beam to a frame of the film to produce a visual image;

manually adjusting the intensity of each of the primary colors in said composite light beam so as to modify the color characteristics of the image; and then recording information representing the corresponding intensity adjustments of all three of said primary colors made within said light source.

5. A method of color correcting a color film whose frames carry a sequence of filmed scenes, comprising the steps of:

selecting a variable light source having three separate mechanical means for adjusting the intensities of three corresponding primary colors of light to thereby produce a composite light beam having a desired chroma and intensity;

applying said composite beam to a frame of the film to produce a visual image;

manually adjusting said mechanical means to desired settings so as to modify the color characteristics of the image;

recording information representing said desired settings of said mechanical means; and thereafter applying another light beam to said frame in order to print a color-corrected duplicate of the film, and while so doing, utilizing the recorded information representing said settings for controlling the chroma and intensity of said other light beam.

6. Apparatus for colorimetric evaluation of photographic film, comprising:

a light source having means for producing three separate light beams corresponding to respective primary colors, manually resettable mechanical means for adjusting the intensity of each of said three beams independently of the others, and means for combining the three separate beams to produce a composite beam;

means for applying said composite light beam to a film to produce a visual image;

means for indicating in numerical form the settings of said manually resettable mechanical means; and means for recording said numerical settings.

7. Apparatus as in claim 6 wherein said means for producing a visual image includes a color television camera and a color television monitor.

8. Apparatus as in claim 7 which further includes a video tape recorder coupled to said television monitor for recording video signals representing the images depicted on said monitor; and means for producing playback signals from said video tape recorder and coupling them to said color television monitor for visually reproducing a series of images for which color corrections have previously been made.

9. A method of colorimetric analysis of a color film whose frames carry a sequence of filmed scenes, comprising the steps of:

selecting from each scene a frame of the film to represent that scene;

from the selected frames in sequence, visually displaying a colorimetrically corrected version of the image carried by each frame and, as each such colorimetrically corrected image is displayed, concurrently recording data representing the values of colorimetric corrections that have been made, and at the same time recording video signals representing the corrected image;

thereafter utilizing said recorded video signals to display in sequence the corrected images corresponding to all of said frames;

as said corrected images are being displayed, re-correcting some of said images if desired; and whenever an image is re-corrected, recording in lieu of the data representing the original colorimetric corrections for that frame, the new data reflecting the colorimetric re-corrections of the same frame;

whereby the corrected and re-corrected data reflecting the desired colorimetric corrections of the entire film is recorded without the necessity of displaying all of the selected frames directly from the film a second time.

* * * * *